3,594,296
APPARATUS FOR GRINDING THE TIPS OF INJECTION NEEDLES
Karlheinz Derwall, Wurselen, near Aachen, Germany, assignor to SCHUMAG Schumacher Metallwerke Gesellschaft mit Beschrankter Haftung, Aachen, Germany
Filed Nov. 14, 1967, Ser. No. 682,750
Claims priority, application Germany, Nov. 15, 1966, Sch 39,817
Int. Cl. B25g 29/00
U.S. Cl. 204—200                                    13 Claims

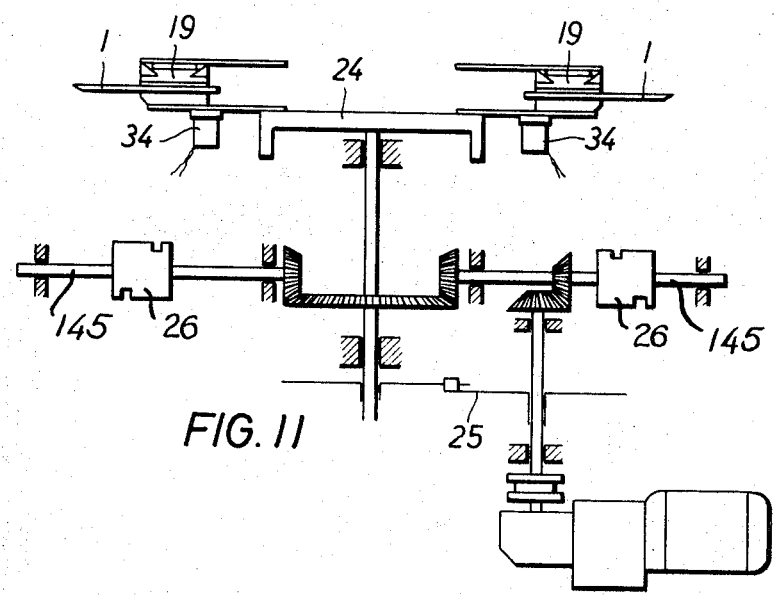
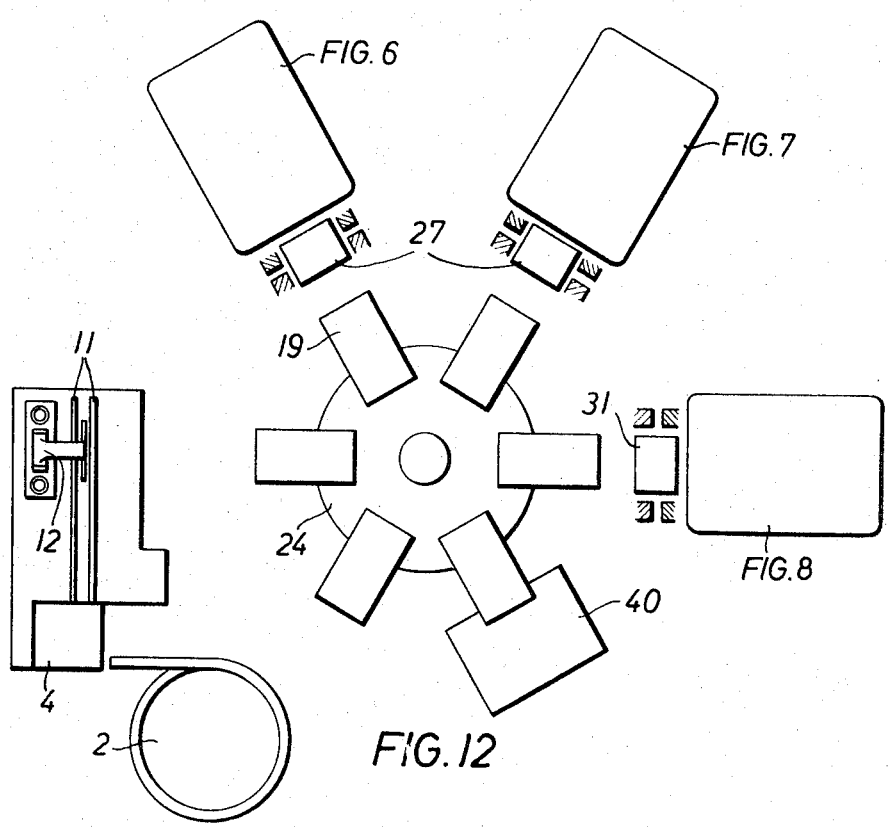

ABSTRACT OF THE DISCLOSURE

An apparatus for grinding the tips of injection needles which are used in hypodermic syringes. The apparatus is of the type wherein electrolytic grinding of the needle tips takes place while the needles are held and ground with a grinding disc during feeding of the electrolyte to the grinding area, the apparatus including the required electrical structure. A holding means is provided for holding a plurality of needles simultaneously during simultaneous grinding of the tips thereof, and a feeding means automatically feeds a plurality of needles to the holding means so that a plurality of needles will be simultaneously held thereby. A control means controls the movement of the holding means and a grinding means one relative to the other so as to bring about the grinding operations, and a removing means is provided for removing the finished needles from the holding means.

---

Thus, my invention relates to machines for grinding the tips of injection needles. In particular, my invention relates to that type of machine where electrolytic grinding operations are carried out while the needles are held by a suitable holding means during the grinding of the needles, the machine including structure for feeding the electrolyte as well as electrical structure.

Non-electrolytic grinding is known, for example, by way of silicon carbide grinding wheels. With grinding of this type, the tips of the ground needles have an undersirable burr which must be removed as by radiation, brushes, in a galvanic bath, or by means of manual filing. In the event that the burr is not completely removed, the subsequent penetration of the injection needle into the skin is very painful. The removal of the burrs according to these known methods is extremely complex, and the tips of the needles have up to the present time primarily been finished by hand. As a result, known methods of mass production are not suited for the manufacture of such needles and the use of mass production techniques is extremely expensive.

In order to avoid these drawbacks it has already been proposed to electrolytically grind the tips of the needles. According to this type of known method, the tube from which the injection needle is to be manufactured is held in a holding unit which is electrically connected with the positive pole of a source of direct current. The grinding wheel is in the form of a diamond grinding wheel having the grinding particles thereof bound by a metal, and this grinding wheel is electrically connected to the negative pole of the source of direct current. A suitable electrolytic solution is fed to the grinding location. The grinding itself is carried out by removal of metal from the ground surface of the tube in an electrolytic manner. The grinding wheel therefore serves essentially only the purpose of continuously eliminating the oxide layer which forms at the grinding location. The feeding of the tube during grinding takes place during observation of an ammeter which is in the electrical circuit. The operations are carried out in such a way that the ammeter is mainted at a predetermined maximum value. This latter indication at the ammeter corresponds to uniform removal of material. Experience has shown that in this way it is possible to achieve a substantially burr-free grinding.

The known apparatus for carrying out this type of method is capable, however, of grinding only a single tube at one time. Moreover, each tube must be ground three times, namely with a primarly ground surface and then with a peaked ground tip involving a pair of grinding operations which provide the interesecting ground surfaces at the peaked tip of the needle. For the purpose of carrying out these different grinding operations on each needle it is necessary either for the needle holder to be turned or each tube which is ground must be held and released a number of times so as to be properly positioned for each grinding operation. The different holding positions for the different grinding operations are manually provided with the known apparatus. Therefore, the known apparatus is to be considered more as a basic testing apparatus than as an apparatus which can serve for mass production.

It is, therefore, a primary object of my invention to provide a machine for grinding the tips of injection needles while avoiding the drawbacks of the known machines, and in particular the above drawbacks.

Thus, it is an object of my invention to provide a machine which is suited for mass production of injection needles.

It is furthermore an object of my invention to provide a machine which is capable of operating in a highly efficient manner to bring about an automated grinding of the tips of injection needles according to mass production techniques, without sacrificing any precision or other quality characteristics in the finished product.

In accordance with my invention a plurality of needles are simultaneously held by a holding means during the grinding of the tips of the needles by a grinding means. In this way simultaneous grinding of a plurality of needles is achieved. The machine of my invention further includes a feeding means for feeding a plurality of tubes to the holding means to be simultaneously held thereby so as to be ground at their tips, and the movement of the grinding means and holding means is controlled, one with respect to the other, in a synchronized automatic manner. Also, the machine has a removing means for removing the finished needles.

Tests have demonstrated that the simultaneous grinding of a plurality of tubes of needles is possible since the current intensities distributed among the plurality of needles which are electrically connected in parallel becomes uniform during the grinding even if initially the tubes which are ground have non-uniform lengths, which initially results in different magnitudes of current in the different needles or tubes. The tests have further demonstrated in the most surprising manner that the time required for providing the uniformity in the current intensities in the different needles is so short that the entire grinding operations are hardly lengthened. These test results are all the more surprising since one would initially assume that that needle which receives the full current intensity before the other needles would maintain at the other needles a correspondingly smaller current intensity so that the grinding operations at the needle which first has the full current intensity and thus the entire grinding operations of all of the needles which are simultaneously ground would have to be sharply retarded. In fact, experience has shown that this latter assumption does not apply. Thus, it is possible to grind a large number of tubes or needles at the same time. The number of tubes which are simultaneously ground are on the order of 20, 40, 100, 150, or 200 which may be simultaneously held in a holding means so that they can all be simultaneously ground. During the grinding operations all of the needles are provided with the primary grinding surface as well as with the pair of intersecting ground surfaces which provide the needles with their peaked tips. It is apparent, therefore, that in the construction of an automatically operating machine considerable problems are to be solved in connection with the feeding of the tubes to the holding means, the controlling of the holding means and the grinding means with respect to their movement one relative to the other, and the removal of the finished needles so that a large number of tubes or needles can be simultaneously handled and worked.

The holding means of my invention which holds the plurality of needles during the simultaneous grinding thereof includes a lower member made of polished steel and an upper member provided with a downwardly directed layer of soft-yieldable elastic material such as rubber. The width of these holding members is selected so that the desired number of tubes or needles can be situated next to each other in the holding means. The ends of the tubes which are to be ground extend through a predetermined distance beyond the edges of the holding members. The use of polished steel for the lower holding member guarantees an exact support which is uniform for all of the tubes, so that a uniform grinding of all of the tubes which are simultaneously held by the holding means and which are simultaneously ground can be carried out with the required accuracy. The formation of the upper holding member with the lower layer of yieldable elastic material guarantees a reliable gripping of all of the tubes with the latter pressed against the lower steel holding member. The degree of softness of the yieldable elastic layer is selected carefully since a material which is too soft is as unsuitable as a material which is too hard. The material which is used for this purpose is capable of simultaneously exerting a sufficiently large pressure distribution on all of the tubes and can transmit the necessary gripping force without a compression which is too great. The members which form the holding means are preferably controlled by way of a cam-and-lever mechanism to bring about the opening and closing of the holding means.

My invention is illustrated by way of example in the accompanying drawings which form part of my application and in which.

Figure 1:
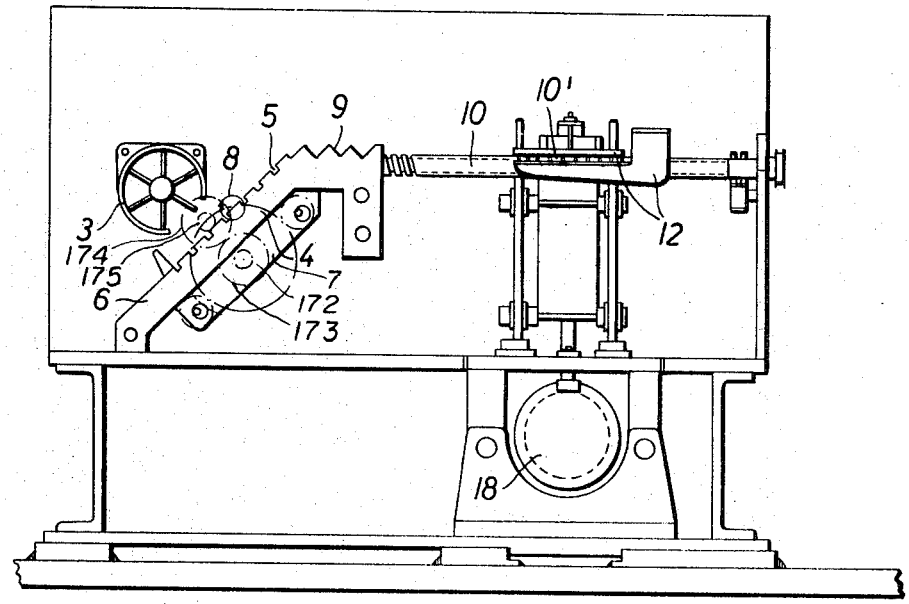
FIG. 1 is a schematic front elevation of a feeding means for feeding the tubes which are to be ground.
Figure 2:
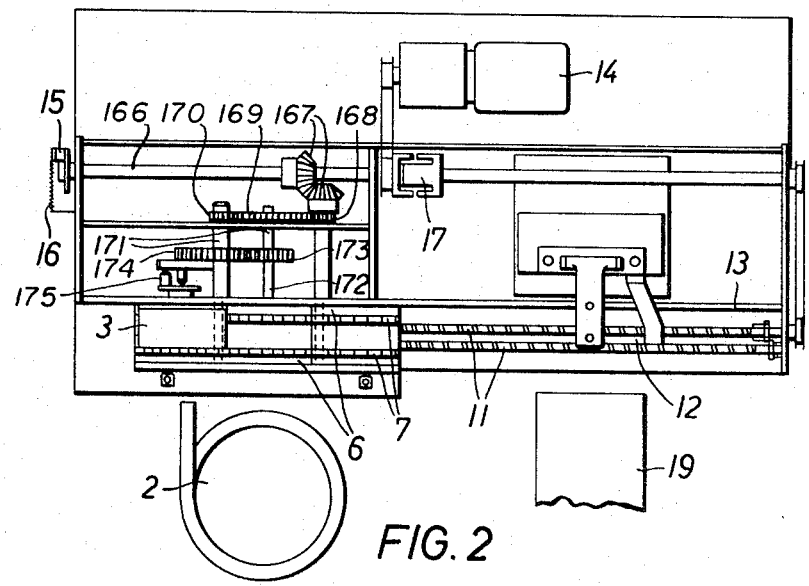
FIG. 2 is a schematic top plan view of the structure of FIG. 1.
Figure 3:
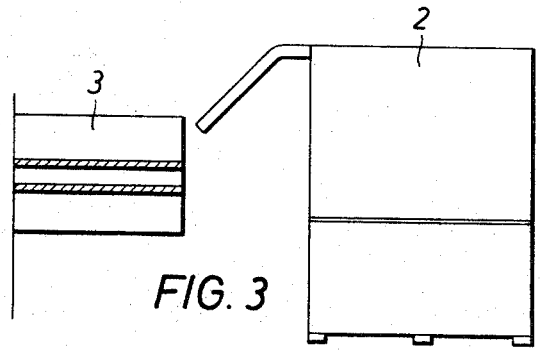
Figure 4:
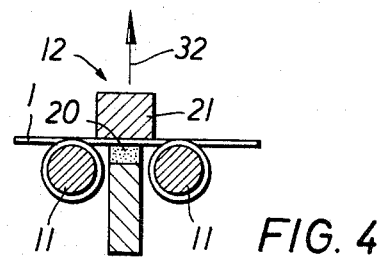
Figure 5:
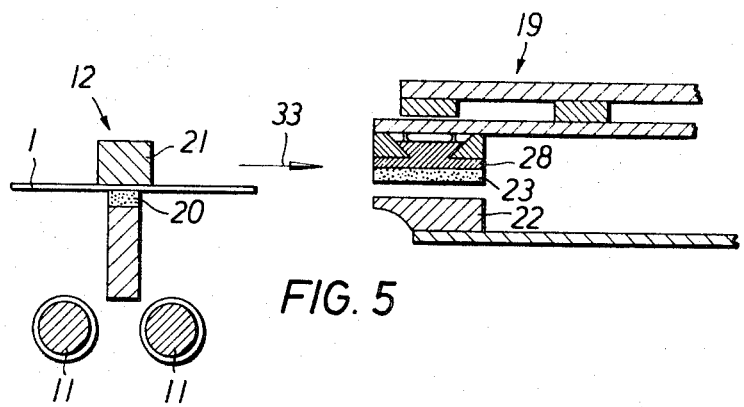
Figure 6:
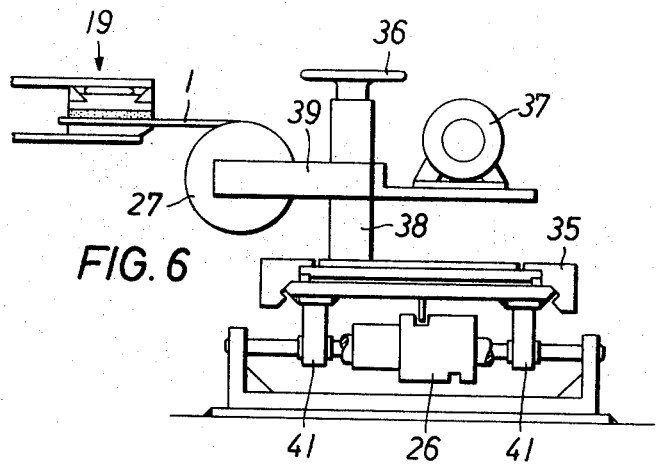
Figure 9:
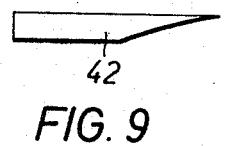
Figure 7:
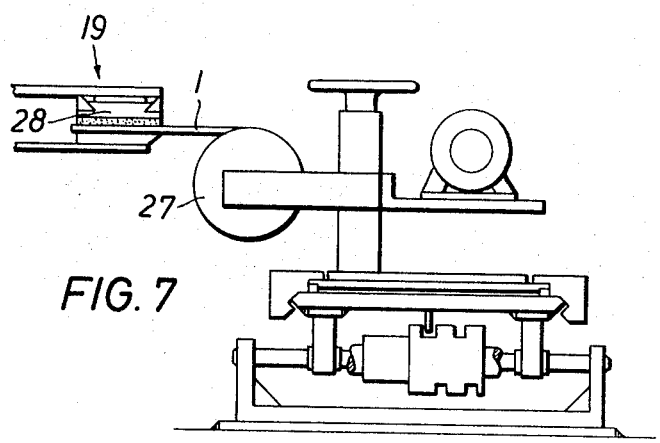
Figure 10:
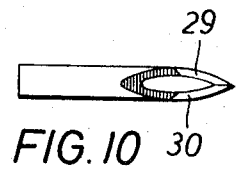
Figure 8:
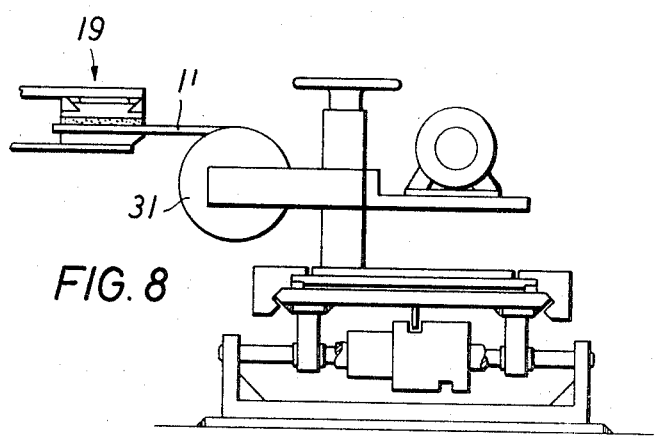
Figure 13:
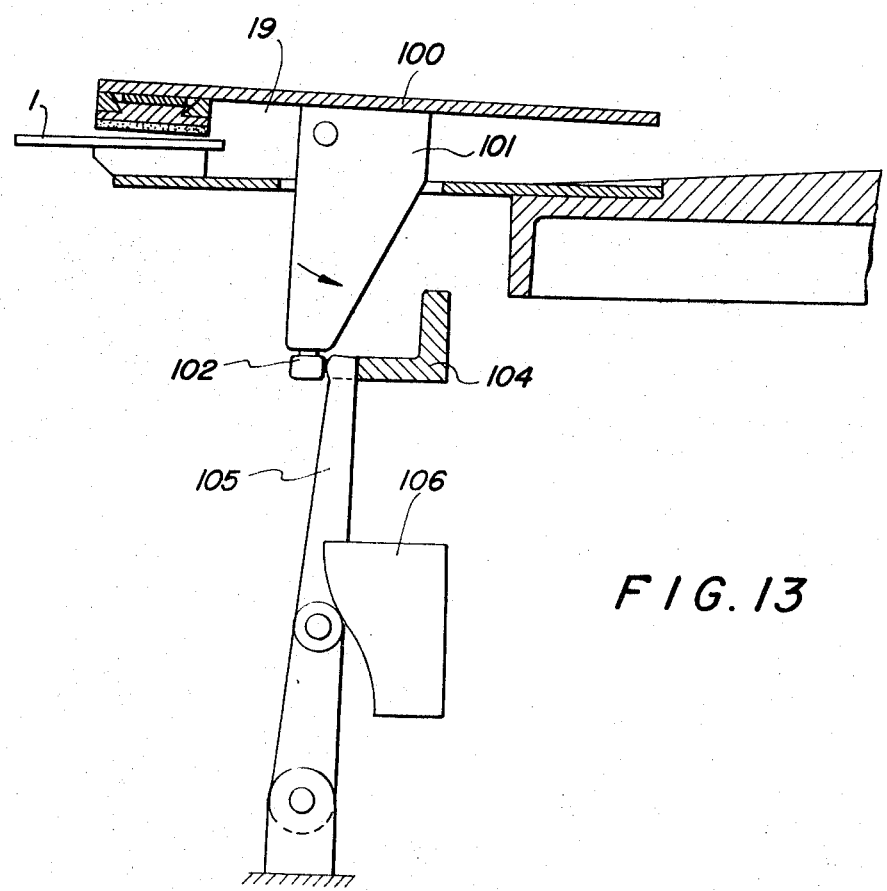
Figure 14:
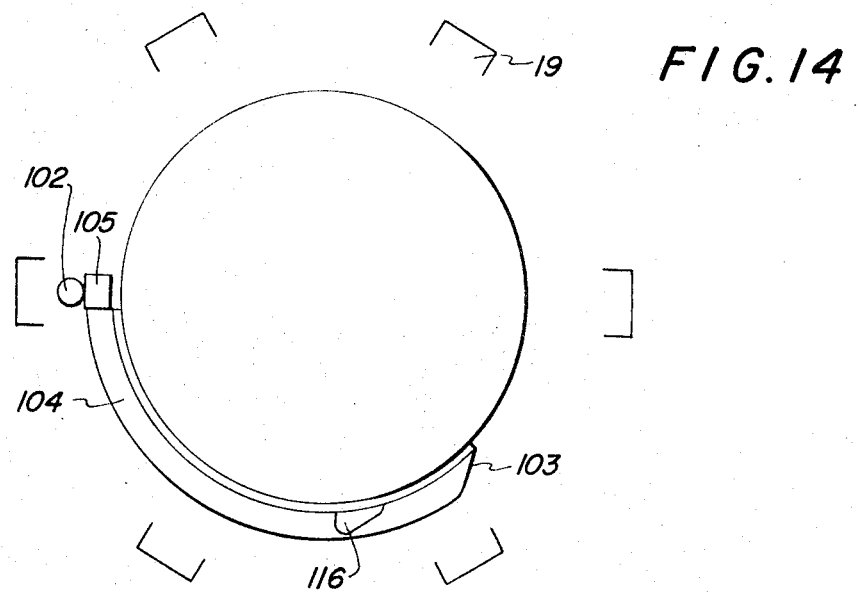
Figure 31:
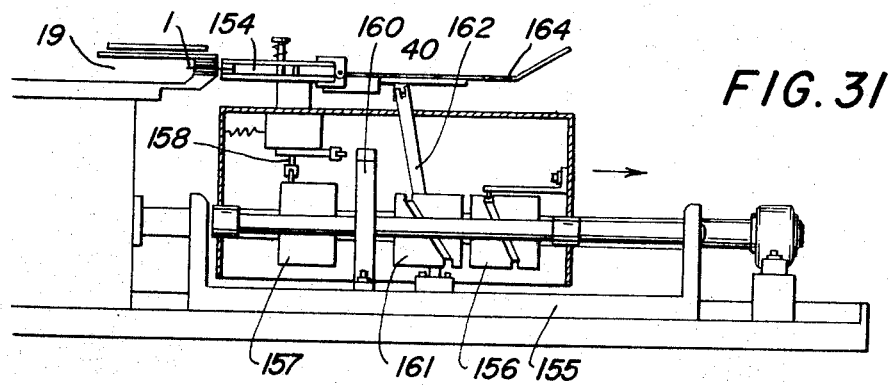
Figure 32:
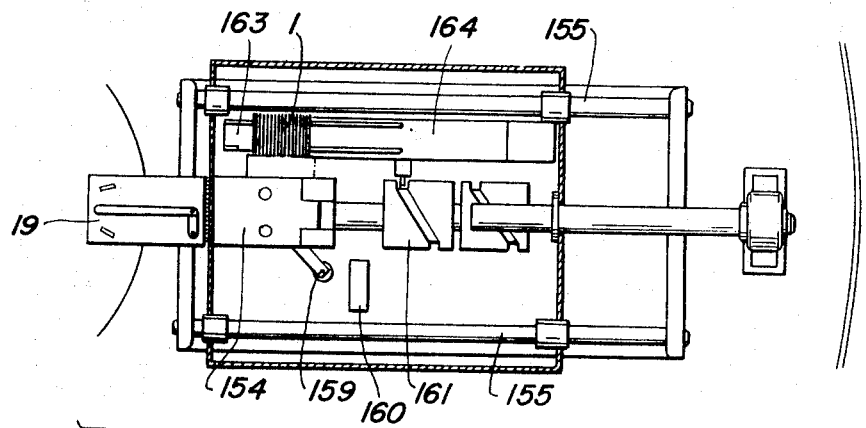
Figure 15:
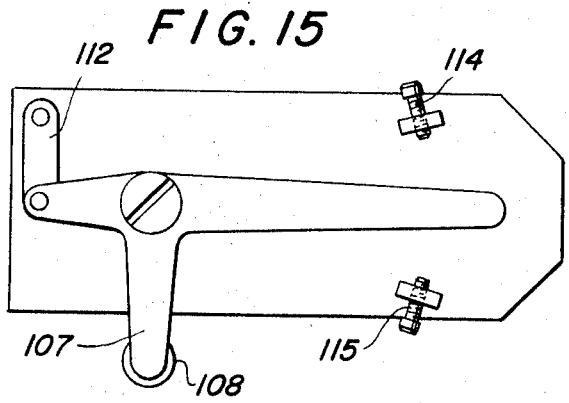
Figure 16:
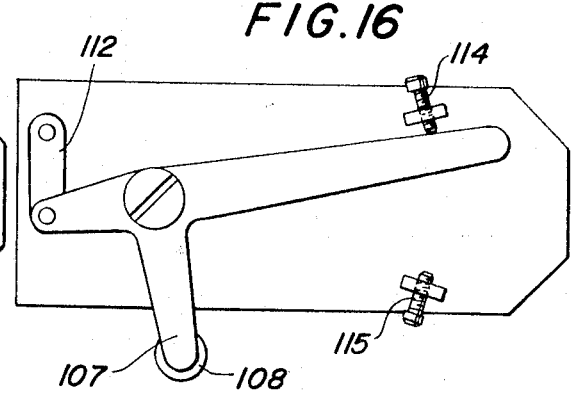
Figure 17:
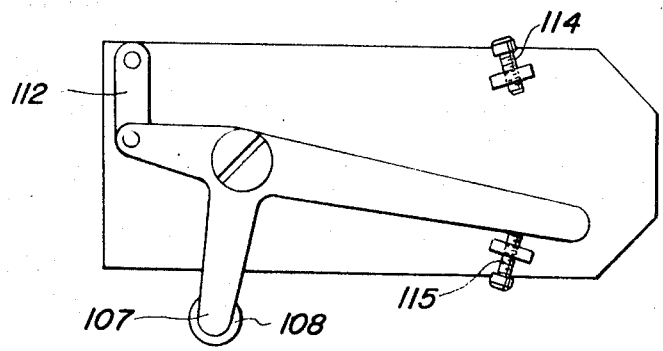
Figure 18:
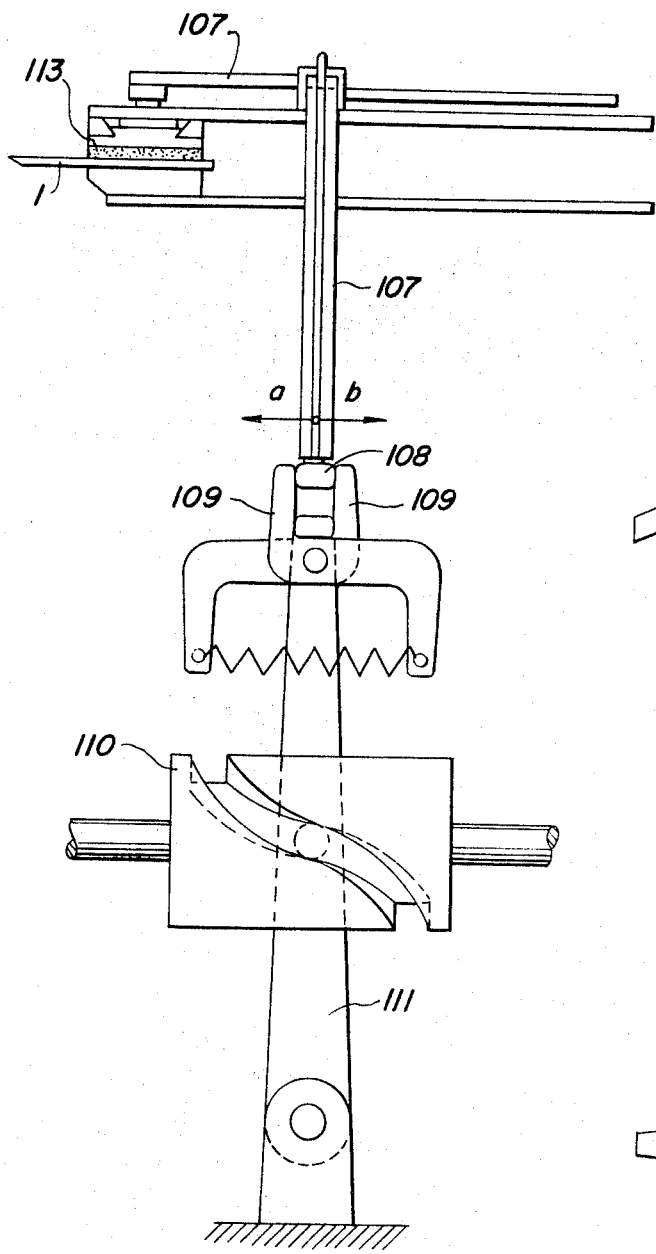
Figure 19:
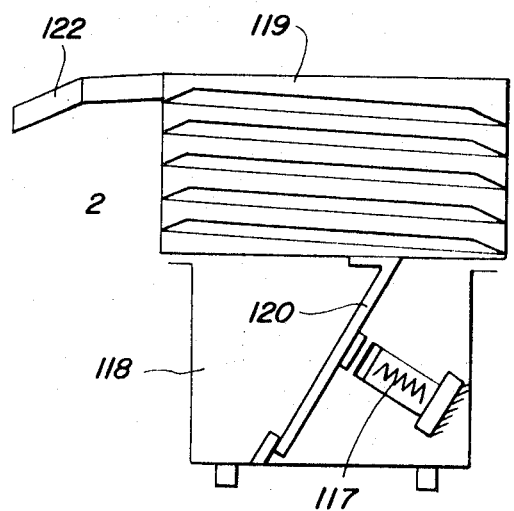
Figure 20:
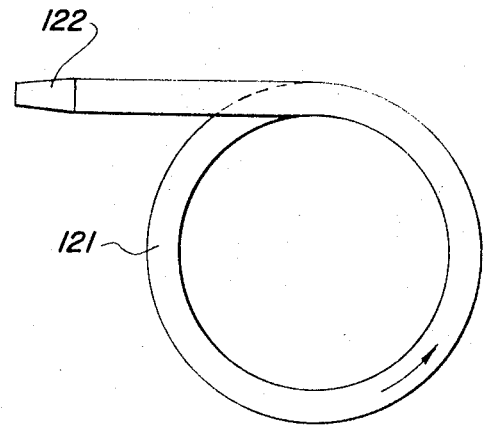
Figure 21:
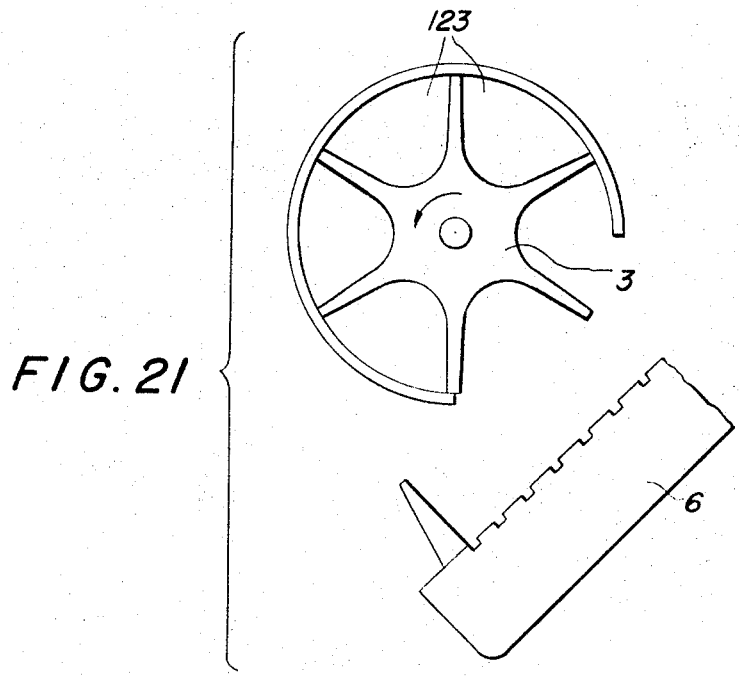
Figure 22:
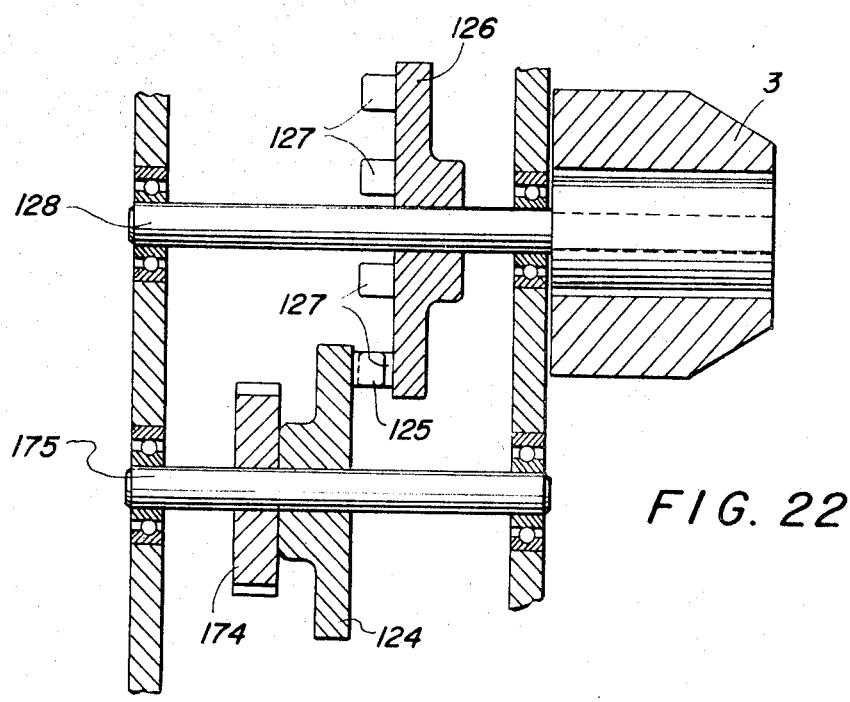
Figure 23:
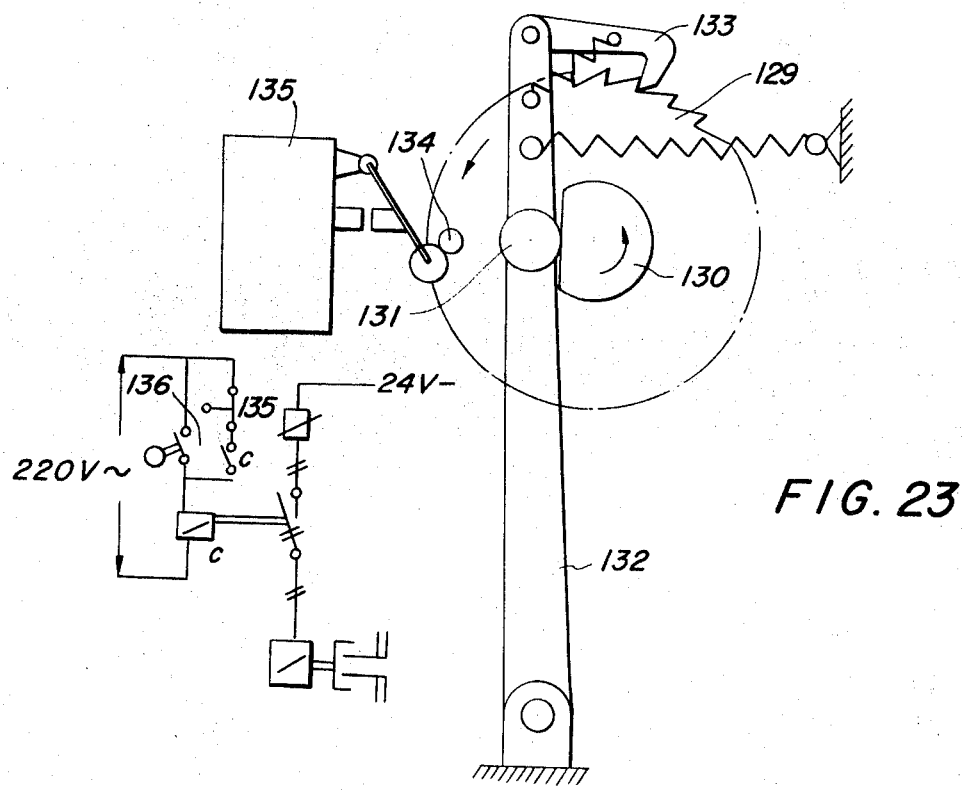
Figure 24:
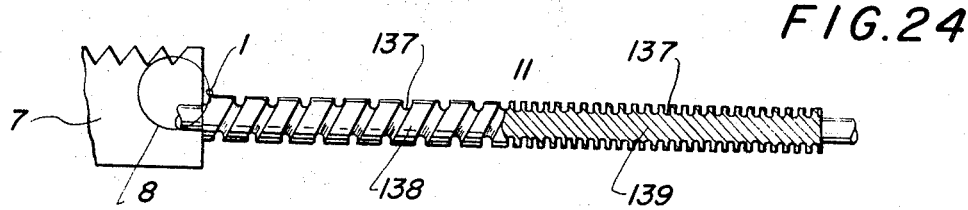
Figure 33:
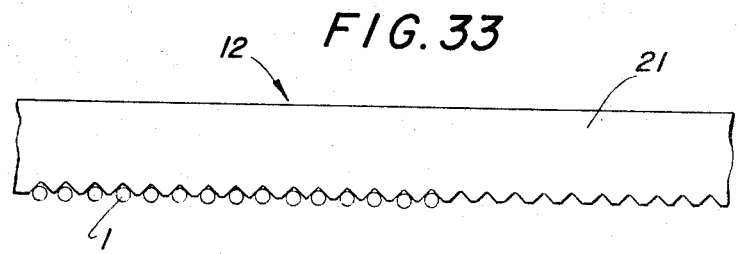
Figure 34:
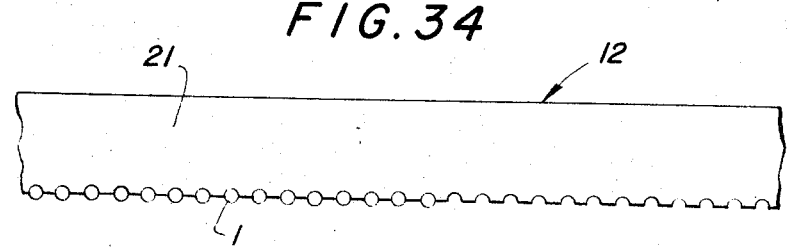
Figure 25:
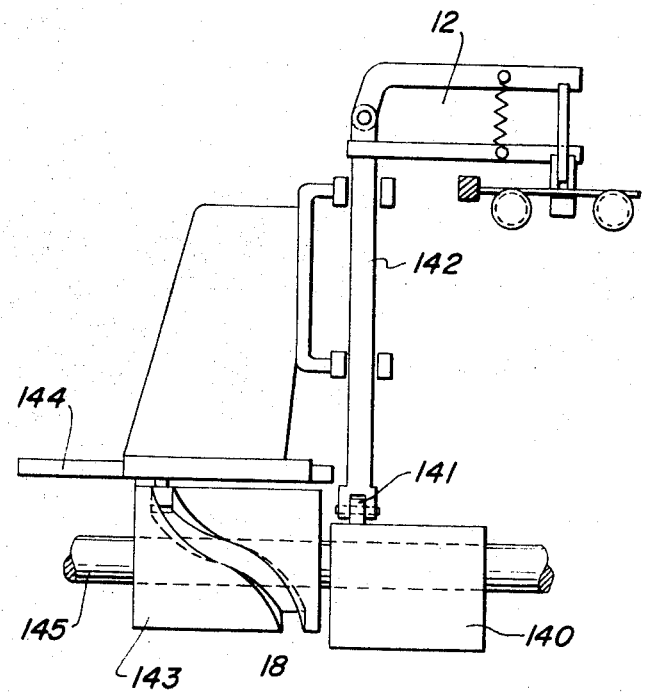
Figure 26:
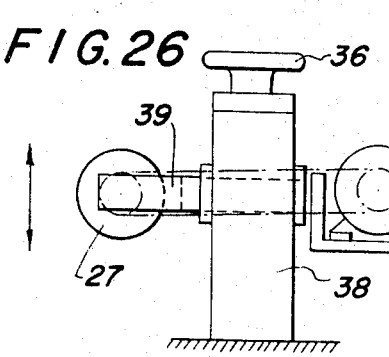
Figure 27:
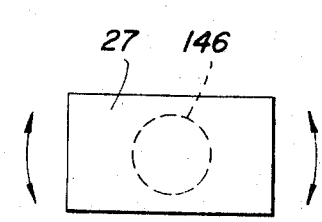
Figure 28:
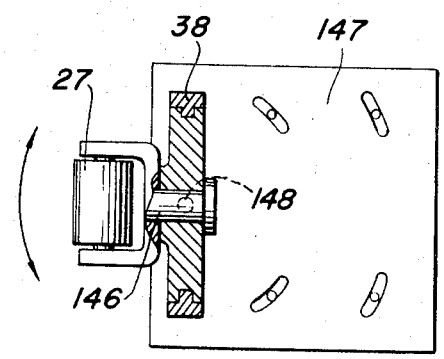
Figure 29:
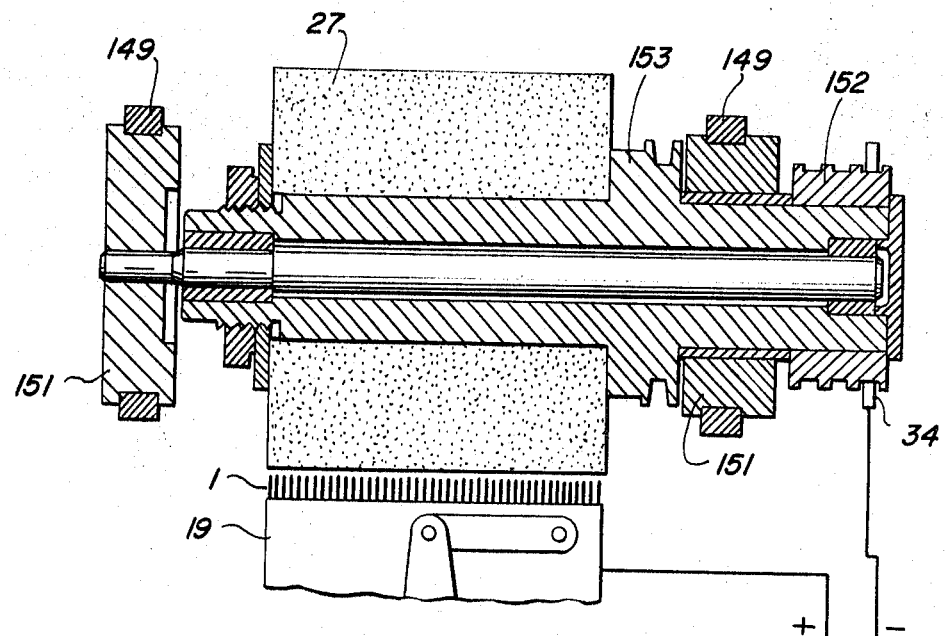
Figure 30:
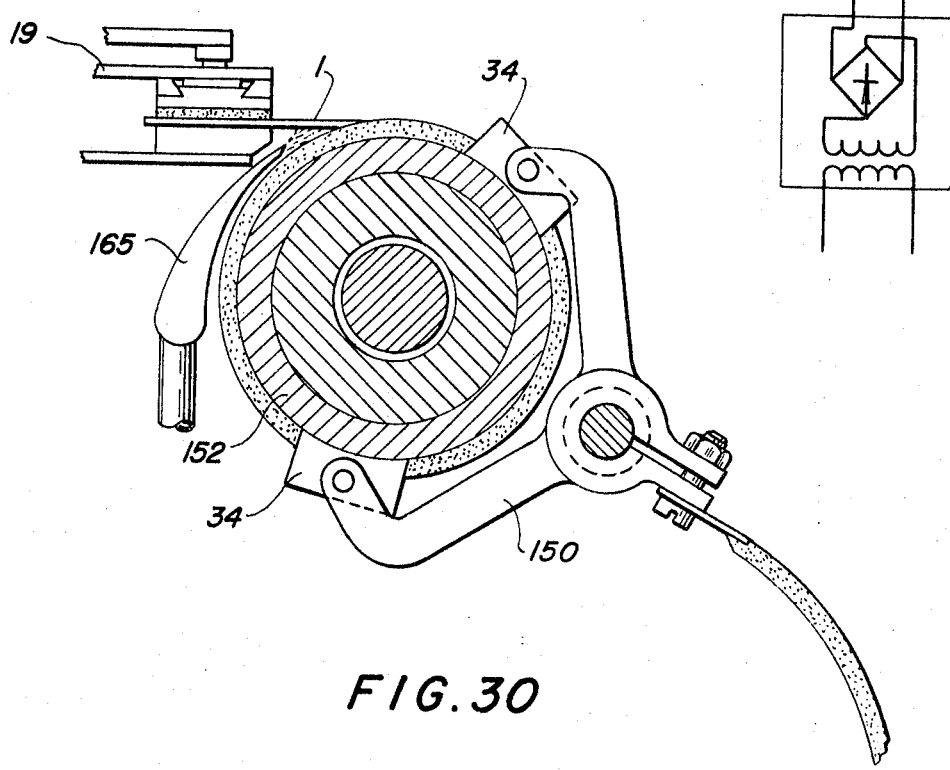

FIG. 3 schematically shows at an enlarged scale, as compared to FIGS. 1 and 2, a vibrator and bucket wheel in side elevation;

FIG. 4 is a transverse section schematically illustrating the operation of a receiving means which receives the tubes from the feeding means;

FIG. 5 is a schematic sectional representation of an operation subsequent to that of FIG. 4 during which the receiving means delivers the tubes or needles to the holding means which is illustrated in FIG. 5;

FIG. 6 is a schematic side elevation of an operating unit for providing the primary ground surface on the needles;

FIG. 7 is a schematic side elevation of the operating unit for providing the peaked ground surfaces at the tips of the needles;

FIG. 8 is a schematic side elevation of the unit for polishing the ground surfaces;

FIG. 9 is a schematic side view, at an enlarged scale, of the needles provided with the primary ground surfaces;

FIG. 10 is a schematic illustration, also at an enlarged scale, of the peaked ground surfaces of an injection needle;

FIG. 11 is a schematic fron elevation at a smaller scale of the drive for the rotary support which carries the plurality of holding means;

FIG. 12 is a schematic top plan view at an even smaller scale of the entire machine of my invention;

FIG. 13 is a schematic sectional elevation showing details of the holding means for holding the needles and details of the structure for actuating this holding means;

FIG. 14 is a schematic plan view of the structure of FIG. 13;

FIG. 15 is a top plan view of the structure of the holding means which actuates the latter to roll the tubes which are to form the injection needles about their axes;

FIG. 16 shows the structure of FIG. 15 in one end position;

FIG. 17 shows the structure of FIG. 15 in an opposite end position;

FIG. 18 is a schematic elevation showing the structure which actuates the components of FIGS. 15–17;

FIG. 19 is a schematic elevation of the vibrator which supplies the blank tubes to the machine;

FIG. 20 is a top plan view of the unit of FIG. 19;

FIG. 21 shows in greater detail the structure for delivering the tubes to the conveyor means;

FIG. 22 is a schematic sectional elevation taken in a plane transverse to that of FIG. 21 and showing the structure for actuating the supply means for delivering the blank tubes to the conveyor means;

FIG. 23 is a schematic side elevation of the structure for counting the number of needles which are treated during one operation at the time when they are delivered to the conveyor means, FIG. 23 also showing a wiring diagram of the electrical controls;

FIG. 24 shows in detail the construction of conveyor screws and how they receive the blank tubes from the conveyor means;

FIG. 25 is a schematic elevation of structure for actuatin gthe receiving means so that it will deliver the blank tubes to the holding means;

FIG. 26 is a schematic elevation of structure for adjusting a grinding cylinder vertically;

FIG. 27 is a schematic illustration of structure for adjusting the grinding cylinder about a horizontal axis;

FIG. 28 is a schematic partly sectional plan view of the structure for adjusting the grinding cylinder about a vertical axis;

FIG. 29 is a longitudinal sectional elevation of the structure which carries the grinding cylinder and the electrical structure which cooperates therewith to provide the electrolytic operation;

FIG. 30 is a transverse section of the structure of FIG. 29 showing how the electrolytic medium is delivered as well as showing how the brushes coact with the electrical structure;

FIG. 31 is a schematic elevation of the unit for removing the finished injection needles;

FIG. 32 is a top plan view of the structure of FIG. 31;

FIG. 33 is a fragmentary longitudinal elevation of details of the receiving means which receives the blank tubes which are to form the injection needles; and FIG. 34 is a fragmentary elevation of another embodiment of the structure of FIG. 33.

The structure of the machine of my invention and the manner in which it operates are set forth in detail below.

After an elongated tube has been cut to predetermined lengths so as to provide the tubes which will subsequently form the injection needles, these tubes 1 are poured into a vibrator 2 of the type which advances the tubes upwardly along a spiral path during vibratory movement so that the thus transported tubes of the vibrator will move from the spiral path thereof out of the vibrator to fall therefrom. The tubes which are in this way delivered from the vibrator 2 are received in a bucket wheel 3. The bucket wheel 3 is operated at predetermined intervals and a predetermined number of tubes 1 fall from the bucket wheel 3 onto a conveyor means 4 which is inclined upwardly at 45° and which successively conveys the tubes along predetermined strokes. This conveyor 4 has at its upper edges notches 5 which achieve, as a result of the inclination of the conveyor 4 and the size and distribution as well as configuration of the notches 5 an individual transportation of each tube 1 upwardly toward the right along the conveyor means 4, as viewed in FIG. 1.

As may be seen from FIGS. 1 and 2, the conveyor means 4 includes a pair of fixed, stationary guides 6 and a pair of movable guides 7, and all of these guides are provided with the notches 5 at their upper edges. The movable guides 7 are driven along an endless path 8 schematically shown in FIG. 1 as being circular, although this path can have an eliptical configuration, if desired. Thus, suitable eccentric drives are connected to the movable guides 7 for turning them in vertical planes along the circular paths 8, so that the guides 7 will move upwardly beyond and longitudinally with respect to the stationary guides 6 to successively advance the tubes along predetermined strokes from one notch 5 to the next notch 5. At each revolution of the eccentric drive the tubes are advanced by one notch further toward the top of the guides of the conveyor means 4. The configuration of the notches 5 and their spacing from each other upwardly along the conveyor prevent falling of the tubes 1, while the horizontal transportation of the tubes is carried out by means of projections and gaps 9 of triangular configuration, the movable and stationary guides 6 and 7 having horizontal extensions provided with the pointed triangular teeth 9. These teeth 9 also assure the desired step-by-step transportation individually of the successive tubes.

At the horizontal outlet of the conveyor means 4 the successive tubes 1 will be received from the last teeth 9 in the first convolutions of the threads 10 of a pair of rotary spindles 11 which during their rotation serve to transport the tubes to a receiving means 12. The threads 10 of the rotary spindles 11 are formed in such a way and are arranged with respect to each other in such a way that the successive tubes 1 always are maintained in positions extending perpendicularly across the spindles 11. The spindles 11 are rotated in the same direction and by their frictional engagement with the tubes in the threads 10 they urge all of the tubes against an elongated stop strip 13 which extends longitudinally along the spindles and which engages the ends of the tubes during the transportation thereof by the spindles so that all of the tubes are precisely positioned longitudinally.

The thread 10 of each spindle has a pair of different pitches. From the conveyor means 4 up to the receiving means 12 the pitch of the thread 10 of each spindle is relatively large, while in the region of the receiving means 12 the pitch 10' is made as small as possible so that a large number of tubes 1 can be simultaneously worked.

The drive for the conveyor means 4 as well as for the spindles 11 is taken from a single driving motor 14 which is common to the conveyor means 4 and the spindles 11. A synchronous built-in counting means 15 opens, by way of a limit switch 16, the circuit of the electromagnetic clutch 17 through which the drive is transmitted to the spindles 11, so that in this way the driving of the spindles 11 is terminated when the required number of tubes 1 have been received between the components of the receiving means 12.

From this location the counted number of tubes 1 at the receiving means 12 are transported thereby to the holding means 19, and the receiving means 12 is acted upon at this time by a vertical and horizontal cam controlling structure 18 which serves to bring about the vertical movement 32 (FIG. 4) and the horizontal movement 33 (FIG. 5) of the receiving means 12 to deliver in this way the several tubes 1 to the holding means 19 shown at the right in FIG. 5. A reliable transfer is brought about by way of the rubber strip 20 and the hold-down member 21 of the receiving means 12, this hold-down member 21 being formed, for further reliability, with grooves in which the tubes 1 are respectively received. After the delivery of the tubes 1 to the holding means 19, a cam-and-lever means which is not illustrated acts on the holding means 19 to close the latter. This holding means 19 has a lower holding member 22 made of polished steel and an upper holding member 28 provided with a downwardly directed rubber strip 23 so that on the one hand the tubes 1 will be gripped between the members 22 and 23 and on the other hand it will be possible for the tubes 1 to be respectively turned about their axes.

As is apparent particularly from FIG. 12, a rotary support means 24, in the form of a circular disc, for example, carries in the illustrated example six holding means 19 which thus form together with the disc 24 a structure similar to a rotary turret head, and a six-sided Maltese-cross drive 25 (FIG. 11) coacts with the rotary support means 24 for turning the latter at increments of 60° about the vertical axis which passes through the center of the disc 24, so that at each increment of turning provided by way of the drive 25 the several holding means 19 will be advanced through 60° from one operating station to the next operating station. At the several operating stations are operating units capable of moving toward and away from the plurality of holding means 19, and after each turning of the support means 24 through a sixth of a revolution, all of the operating units move toward the plurality of holding means 19.

At the first operating station is located the operating unit which is shown in FIG. 6, and the location of this unit is schematically designated by the label "FIG. 6" in FIG. 12. This operating unit which is shown in FIG. 6 provides each tube with its primary ground surface 42 (FIG. 9), and these primary ground surfaces are provided at the tips of the tubes by way of the known electrolytic grinding process. The grinding unit of FIG. 6 is moved to and from its operating location by way of the synchronous control of a cam 26, so that in this way the unit of FIG. 6 will be moved into engagement with the tubes 1.

The grinding operations, provided with power from a driving motor 37, takes place simultaneously with an oscillating movement of the carriage 35 supported by the straight-line guide means 41 in the form of ball boxes, so that the diamond grinding wheel 27 is oscillated axially. The diamond grinding wheel 27 is additionally swung in elevation about its vertical and horizontal axes by way of the supporting structure provided by the grinding wheel stand 38 and the bearing block 39 with the manually operable adjusting wheel 36. In contrast with the heretofore known type of Elysier grinding spindle, where the grinding wheel is supported for rotary movement in a free floating manner and rotates with the shaft, the relatively wide diamond wheel 27 used with the structure of my invention is supported for rotary movement by bearings situated at the ends of the wheel 27 and the wheel 27 is fixed on a rotary sleeve which has a stationary axis.

The carbon brushes 34 for the feeding of current are thus insulated from and mounted in the bearing block and transfer the current to a copper slip ring at the pulley side of the sleeve by which the current is delivered to the diamond grinding wheel 27 whose particles are bound by a suitable electrically conductive metal.

The operating unit which is shown in FIG. 7 and which is located at the second operating station provides the peaked grinding surfaces 29 and 30 which intersect each other as indicated in FIG. 10. The primary difference between the unit of FIG. 7 and that of FIG. 6 resides in the fact that the unit of FIG. 7 is advanced twice into engagement with the tubes 1 while the holding means 19 remains stationary. The holding means 19 is constructed in such a way that as a result of shifting of its upper holding member 28 (FIG. 5) by way of a synchronously controlled cam and lever means, any desired angular adjustment of the tubes 1 may be achieved so as to control the grinding of the peaked surfaces 29 and 30. The operations at this station are as follows:

After the rotary support means 24 has been turned through the increment of 60°, the tubes 1 are respectively turned about their axes and the unit of FIG. 7 is fed toward and into engagement with the tubes 1 so as to grind the first peaked surfaces 29 thereof. Then the unit of FIG. 7 is retracted away from the tubes 1, and the latter are turned to situate their other sides in the path of movement of the grinding wheel, whereupon the unit of FIG. 7 is again fed forwardly into engagement with tubes 1 so as to grind the second peaked surfaces 30 thereon. Thereafter the unit of FIG. 7 is again withdrawn and the next increment of turning of the rotary support means 24 takes place.

The third operating unit shown in FIG. 8 and located at the third operating station serves to polish the ground surfaces and to eliminate the oxide layer. This unit operates basically in the same way as the other units of FIGS. 6 and 7. The polishing brushes 31 can take the form of glass or polyamide hair brushes, and in this latter connection nylon hair brushes may be used.

At the fourth station 40 the finished needles are removed with a cam-and-lever means acting on the holding members of the holding means 19 to open the latter at the station 40 so as to bring about removal of the finished needles.

Thus, with the above-described structure of my invention there are a plurality of holding means 19 which are successively supplied with the tubes 1 and which successively deliver the tubes 1 to the locations where the successive operations take place. Therefore, while certain predetermined holding means 19 open, other remain closed to hold the tubes carried thereby in proper positions for grinding, and some holding means are opened simultaneously with the closing of other holding means while still other holding means remain closed. These different operations of the several holding means of the machine of my invention are brought about by a mechanism which provides the required controls with a suitable cam-and-lever means which acts on the holding means.

Another unillustrated cam-and-lever means brings about the synchronously controlled lateral movement of the upper holding member 28 so as to turn the several tubes through the required angles to produce the peaked ground surfaces as referred to above. In connection with this operation all of the tubes are simultaneously and uniformly turned through a predetermined angle. For the precision of this angular turning of the tubes the above mentioned downwardly directed layer of soft yieldable elastic material 23 is provided at the upper member 28. This layer 23 assures a uniform gripping relationship for all of the tubes and the friction between the layer 23 and the walls of the tubes is the same for all of the tubes. Since the lower holding member 22 is made of ground or polished steel, it provides for all of the tubes a precisely defined rolling surface, and thus there is achieved for all of the tubes a uniform turning angle during the lateral shifting of the upper holding member 28. During the grinding operations three predetermined angular positions are provided for the tubes, one for the primary ground surface, a second for the first peaked surface, and a third for the second peaked surface. This construction of the holding means and its control mechanism provides a simple structure for the simultaneous angular adjustment of a plurality of tubes which are simultaneously ground. Therefore, a high quality mass production operation is made possible.

The several guide strips of the conveyor means 4 which are provided with the notches 5 at their upwardly inclined portions and with the triangular teeth at their horizontal end extensions deliver the tubes to the threaded spindles 11 whose threads 10 have a configuration and a relationship to each other which will reliably maintain the tubes extending perpendicularly across the spindles and urged into engagement with the stop strip 13 so as to achieve an automatic orientation of the tubes.

The relatively large-pitch portion of the threads 10 in the first part of the threaded spindles 11 provides a rapid feeding of the tubes while the smaller-pitch portion in the region of the receiving means 12 includes convolutions which register with the grooves formed in the upper member 21 of the receiving means 12 to reliably locate the tubes to be received in these grooves of the hold-down member 21. The feeding of the tubes from the receiving means 12 in order to carry out the further operations on the tubes involves initially the delivery of the tubes to the particular holding means which is in position to take the tubes from the receiving means. It is apparent from the above description that the tubes are arranged and oriented in a manner which is required so that they can be taken by the holding means 19, held thereby, and transported and moved thereby, so as to be capable of carrying out all of the operations.

The common drive for the conveyor means 4 and the spindles 11 has the advantage of synchronizing the operation of the conveyor means 4 and spindles 11 with respect to each other in such a way that the individually transported tubes which are transported by predetermined increments by the conveyor means 4 are synchronously delivered to the individual convolutions of the threads of the spindles 11. As a result of this synchronism a gap-free individual transportation of the tubes in a uniform row is assured.

As was indicated above, the synchronously operating counting mechanism 15 brings about by actuation of the limit switch 16 the de-energizing of the electromagnetic clutch 17 so as to stop the operation of the spindles 11 and preferably also of the conveyor means 4, the bucket wheel 3, and if desired also the vibrator 2. Because of the intermittent interruption of the feeding of the tubes, the receiving means 12 is capable of carrying out the delivery of a predetermined number of tubes to a holding means when this predetermined number of tubes has been received by the receiving means, without any possible delivery in an undesired manner of further tubes which would undesirably influence the uniform performance of all of the operations.

The vertical and horizontal movement of the receiving means 12 brought about by the cam means 18 in the manner shown schematically in FIGS. 4 and 5 reliably delivers the tubes to the required holding means 19, and these operations take place simultaneously for the predetermined number of tubes which are simultaneously held by the receiving means 12 and delivered to the holding means 19.

The structure of my invention also provides a synchronization in the stopping of the operation of the conveyor means and spindles 11, as well as preferably a stopping of the operation of the bucket wheel 3 and vibrator 2, followed by the vertical and horizontal movements of the receiving means and the closing of the holding means 19 which reecives the tubes from the receiving means 12, this latter closing operation then being followed by the above-described movements of the plurality of holding means 19 and the operating units of FIGS. 6–8.

The increments of movement of the plurality of holding means 19 provided by way of the drive 25 and the movements of the units of FIGS. 6–8 toward and away fom the several holding means 19 provides an extremely practical operation. As was pointed out above, with the structure of my invention the control mechanism provides by way of the synchronously controlled cams a movement of the units of FIGS. 6–8 away from the holding means 19 before the latter are turned through the required increment and a return of the operating units into engagement with the tubes at the plurality of holding means after the turning of the plurality of holding means through 60° has taken place.

The oscillating movement of the grinding wheel 27, as referred to above, prevents the formation of grooves in the grinding surface. The swinging movement of the grinding wheel serves primarily to adjust the elevation of the grinding wheel with respect to the work. This adjustment will be determined by the diameter of the tube which forms the injection needle as well as by the desired angle at the ground tip of the injection needle.

With the electrical structure of the machine of my invention, the mounting of the grinding wheel for rotary movement at both of its ends and the fixing thereof on a rotary sleeve which has a stationary axis, makes possible the mounting of the carbon brushes for the electrical connection with the negative pole of the source of current in an insulated manner in the bearing block and by way of the copper slip ring which coacts with the brushes and electrical connection is made to the pulley side of the sleeve so that an electrical connection from the brushes through the copper slip ring, the sleeve and the metal binding of the diamond grinding wheel is provided while the electrical connection with the positive pole of the source of current takes place through the holding means 19 for the tubes, so that the electrical circuit is closed by the electrolyte which is fed to the grinding location.

This structure of my invention, preferably with the end bearings for the grinding wheel, among other features, is particularly suitable for the achievement of an accurate grinding operation.

As was pointed out above, after the peaked surfaces are ground, the ground surfaces are polished and the oxide layer is removed by way of the brass or polyamide hair brushes at the third operating station, and at the fourth station the removing means 40 will bring about an opening of the plurality of holding means 19 which successively reach the removing means 40 by way of a cam-and-lever means which acts on the members of each holding means 19 to open the latter so as to remove the finished needles.

The details of the structure located at the station 40 where the finished needles are removed are illustrated in FIGS. 31 and 32. The removal of the needles 1 with the finished points takes place by way of synchronously controlled holding members which are actuated by cams. The holding members 154 are in the form of a pair of plates capable of being displaced toward each other to hold the needles therebetween and away from each other to release the grip on the needles. Thus, these plates 154 act in a manner similar to a pair of tongs. These members 154 are carried by a box-shaped guide 155 which is guided for longitudinal movement to the right and left, as viewed in FIG. 31, and FIG. 31 shows an arrow indicating movement of the guide 155 to the right. A cam 156 acts on the guide 155 to displace the latter and the gripping members 154 toward the holding means 19 which happens to be located at the station 40 after the last increment of turning of the turret structure which carries the several holding means 19. The shaft which rotates the cam 156 also rotates a cam 157 which has its axis displaced from that of the rotary shaft which turns the cam 157, so that the surface of the latter is vertically displaced to bring about a vertical movement to a plunger 158 having a cam follower in the form of a roller engaging the exterior surface of the eccentric cylinder or cam 157. Thus, this cam 157 will actuate the plunger to open and close the gripping elements 154. When the cam 156 acts to displace the gripping members 154 toward the holding means 19 at the station 40 the cam 157 locates the grippers 154 in their open position where they will receive the free ends of the finished tubes 1 between themselves, and then the cam 157 bring about closure of the grippers 154 after which the cam 156 acts to retract the grippers 154 and the pointed needles held thereby in the direction of the arrow of FIG. 31 away from the holding means 19.

During this retracting movement when the pointed needles are removed from the holding means 19 at the station 40 an arm which is fixed to the structure which carries the grippers 154 and which has a roller 159 at its free end engages with the latter roller a stop 160 which is fixedly mounted on the base structure of the longitudinal guide means 155. The structure which carries and mounts the grippers 154 on the upper box-shaped component of the guide means 155 supports the grippers 154 on the latter box-shaped structure for swinging movement about a vertical axis, and the result is that when the roller 159 engages the stop 160 during the movement of the upper box-shaped element to the right, as viewed in FIGS. 31 and 32, the grippers 154 are swung through 90° in a clockwise direction, as viewed in FIG. 32, and thus the needles are displaced from the holding means 19 to the position shown in FIG. 32, where the needles 1 are situated over a member 164 onto which they are to be deposited. A cam 161 coacts with the lever 162 for actuating a stripper 163 which serves during this actuation to strip the finished needles 1 from the gripper 154 and deposit them onto the receiving plate 164.

During the next operation when needles are removed from the next holding means 19, a spring pulls the grippers 154 again through 90° back to their original position as the roller 159 moves to the left, as viewed in FIG. 32, away from the stop 160. The cams 156, 157, and 161 are carried by one of the five shafts 145 (FIG. 11) which are driven from the main drive of the machine.

The structure for controlling the holding means 19 is illustrated in FIGS. 13 and 14. As is apparent from FIG. 13, the upper part of the holding means 19 includes a gripping plate 100 carried by the top end of a lever 101 which carries at its bottom end a cam-follower roller 102. During the increments of turning of the several holding means 19 after each operation, the roller 102 will initially engage the end 103 (FIG. 14) of a cam 104 in the form of a segment of a circle, and the result is that as the roller 102 moves along the outer periphery of the arcuate segment 104 the holding means 19 is maintained in its open position, and this is the position which it has when it receives the blank tubes 1 from the receiving means 12.

In order to close the holding means upon the tubes 1 so as to maintain these tubes gripped by the holding means 19 to move therewith, the cam-follower roller 102 is displaced, when moving beyond the cam segment 104, into engagement with a lever 105 which, after the tubes 1 are delivered to the holding means 19, is controlled by a cam 106 bringing about swinging of the lever 105 in a clockwise direction, as viewed in FIG. 13, so that the holding means 19 will now assume its closed position, any suitable unillustrated spring structure acting on the upper plate 100 to urge the latter downwardly at its left end, as viewed in FIG. 13, when no opposing force acts on the plate 100 through the lever 101 and the roller 102.

FIGS. 15–18 illustrate the details of the structure for turning the several tubes 1 respectively about their axes to bring about grinding of the tip in the manner described above and shown in FIGS. 9 and 10.

When the holding means 19 reaches the station for grinding the peaked surfaces, indicated in FIGS. 7 and 10, the swing lever 107, which has an upper horizontal leg apparent in FIGS. 15–17 and a vertical depending leg apparent in FIG. 18, has its lower roller 108 shown in FIG. 18 situated between the upper ends of the pair of swing levers 109 which simultaneously turn in opposed directions about a common axis and which are acted upon at the lower ends by the spring illustrated in FIG. 18. In other words each holding means 19 has at its upper plate a swing lever 107, and as each holding means reaches the station where the structure of FIG. 7 is located the roller 108 at the lower end of the lever 107 of each holding means is received between the upper ends of the levers 109 shown in FIG. 18.

Immediately upon location of the roller 108 between the upper ends of the levers 109, the cam 110 rotates to act through the lever 111 on the pair of levers 109 which are pivotally carried at the top end of the lever 111 for swinging movement about a single axis. At this time the lever 107 is swung in the direction of the arrow *b* shown in FIG. 18 so as to swing the lever 107 to the position of FIG. 16 where it engages the adjustable stop screw 114, to exert a forward pull on the link 112 which through an opening of the upper plate of the holding means 19 is swingably connected with the shiftable component 28 shown in FIG. 7. As a result the upper tube engaging element 113 indicated in FIG. 18 is longitudinally shifted to rotate all of the tubes 1 about a predetermined angle. Then the grinding unit shown in FIG. 7 is actuated so as to bring about the grinding of the first of the pair of peaked surfaces, and after this latter surface is ground the unit of FIG. 7 is retracted away from the tubes. At this time the structure of FIG. 18 operates to displace the lever 107 in the direction of the arrow *a* so as to swing the lever 107 about the axis of the screw whose head is visible in FIGS. 15–17 to the position of FIG. 17 where it engages the other adjustable stop screw 115, and now the link 112 is displaced to the position of FIG. 17 acting on member 113 to turn the tubes 1 through their original angular positions to opposed angular positions in preparation for the grinding of the second peaked surface, after which this latter surface is ground and the parts are returned to their original positions.

During the further turning of the holding means 19 with the turret assembly the lever 107 engages the cam 116 which is shown in FIG. 14 so as to be returned to the intermediate initial position shown in FIG. 15, and now the holding means is in the proper position for removal of the finished needles and for receiving a new supply of needles. By way of the adjustable stop screws 114 and 115 it is possible to adjust the structure to provide any desired angle for the peaked surfaces. Also, the adjustment of the stop screws 114 and 115 is suitable for tubes of different diameters. The region of adjustment, however, is brought about only by way of a single cam 110 which is designed for the maximum stroke which will be encountered in practice, inasmuch as when the lever 107 engages one or the other of the stop screws 114 or 115 it is possible for the lever 111 to continue to turn as a result of the spring connection between the levers 109.

The details of the vibrator 2 are shown in FIGS. 19 and 20 in a schematic manner. The vibrator 2 includes a pair of electromagnets 117 which serve to drive the lower portion 118 of the vibrator shown schematically in FIG. 19. This lower portion 118 carries the container 119 into which the blank tubes 1 are poured. By way of a predetermined relationship of the pair of magnets 117 with respect to each other, the container 119 which is supported on the springs 120 is set into vibratory motion, and the tubes 1 displace themselves, as a result, upwardly along the helical guiding structure 121 which is of screw-shaped configuration, so that these tubes gradually approach the top of the container 119 to slide downwardly along the slide 122 into the bucket wheel 3. This vibrator structure is conventional and can be purchased as a separate unit.

The bucket wheel 3 is situated within a casing provided with an upper opening whose size and location is such that the tubes delivered from the vibrator will be received in the bucket wheel 3. Referring to FIGS. 2, 21, and 22, it will be seen that between the element 15, constituted by the counting mechanism of FIG. 23, and the element 16, constituted by the limit switch component 135 of FIG. 23, and the bucket wheel 3 there are in fact no electrical connections. The bucket wheel is mechanically operated. This bucket wheel 3 serves the purpose of receiving the tubes 1 from the vibrator 2 in the individual chambers 123 of the bucket wheel so as to deliver the tubes from these chambers to the components 6 and 7 of the conveyor means 4.

From the primary drive 166, shown in FIG. 2, a pair of bevel gears 167 transmit the drive to gears 168, 169, and 170 which successively mesh one with the next, so that the drive is transmitted to the rotary eccentric shafts 171, directly connected to the gears 168 and 170 for rotation therewith, and it is these eccentric shafts, which rotates about axes parallel to but shaped from their own axes, which serve to provide the components 7 of the conveyor means 4 with the circular paths of movement 8 referred to above.

The shaft 172, however, which is driven from and coaxial with gear 169 which is located between and meshes with the gears 168 and 170 serves to drive a gear 173 which meshes with and drives a gear 174 which is fixed to and carried by the rotary shaft 175, which is illustrated in FIGS. 2 and 22.

The disc 124 is also fixed to the shaft 175 and rotates continuously therewith, and this disc 124 carries a single roller 125 at the region of the outer periphery of the disc 124. This roller 125 extends at each revolution of the disc 124 into the space between a pair of rearwardly directed teeth 127 carried by the disc 126 which is fixed to the shaft 128 which is supported for rotary movement and which is directly connected to the bucket wheel 3. In this way at each rotation of the disc 124 the bucket wheel 3 is turned through a given angular increment, and thus a stepwise drive is provided for the bucket wheel 3, each angular increment of turning of the bucket wheel 3 causing the latter to be turned through an angle occupied by one of the chambers 123, so that at each increment of turning a group of tubes 1 which are situated within a chamber 123 will drop from the bucket wheel 3 to the conveyor means 4.

Referring now to FIGS. 33 and 34, different embodiments of the notches of component 21 of receiving means 12 are respectively illustrated therein. Thus, FIG. 33 shows that these notches of component 21 which receive the tubes 1 can take the form of triangular gaps separated by substantially triangular or prismatic teeth of trapezoidal configuration, while in FIG. 34 it is shown that these notches can be of semi-circular configuration, if desired. This notched configuration of component 21 of the receiving means 12 guarantees that the tubes 1 will be maintained parallel to each other when displaced from the spindle 11 to the holding means 19.

Referring now to FIG. 23, the details of the counting device 15 which is also the control switch for the electromagnetic clutch 17 are illustrated.

In accordance with the particular diameters of the particular tubes 1 which are to be treated with the structure, a holding means 19 of a given width will only be capable of accommodating a predetermined number of tubes 1. The achievement of this latter predetermined number is brought about by way of the mechanical counting structure shown in FIG. 23, this latter structure rotating synchronously with the transporting spindles 11 at a ratio of 1:1. The ratchet discs 129, one of which is illustrated in FIG. 23, respectively have a number of teeth corresponding to the number of tubes 1 which will be delivered to the holding means 19, and ratchet teeth 129 of different sizes are interchangeably mounted on the shaft which carries the cam 130. Thus, in accordance with the required number of tubes 1 a predetermined ratchet disc 129 will be mounted on the shaft which carries the cam 130. Thus, the number of teeth of the selected ratchet 129 corresponds to the number of tubes 1 which will be delivered to the holding means 19. The shaft which carries the ratchet 129 is turnable with respect thereto, or a separate shaft may carry the disc 129 with a second shaft being connected to the cam 130 for rotating the latter. At each revolution of the cam 130 the cam-follower roller 131 is actuated to swing the lever 132 which carries this roller in opposition to the spring which maintains the roller 131 in engagement with the cam 130, and in this way a pawl 133 which is pivotally connected to the top end of the lever 132 and which is urged by a spring into engagement with the teeth of the ratchet 129 is acted upon to displace the latter through an increment of one tooth. Any suitable structure is provided to prevent reverse turning of the ratchet 129 in a clockwise direction. Thus, at each increment of turning of the ratchet 129 one tube will be counted. After the ratchet 129 has turned through a complete revolution, an actuating pin 134 which is carried thereby engages the limit switch 135 which is electrically connected with the electromagnetic clutch 17 so as to act on the switch 135 to deenergize the clutch 17, and thus a predetermined number of tubes 1 are positioned in readiness to be transferred by the receiving means 12 to the holding means 19.

As is apparent from the upper right portion of FIG. 1, during the vertical displacement of the receiving means 12, a second limit switch 136 is actuated so as to again bring about energizing of the clutch 17, so that now the conveying of the tubes 1 can be resumed.

The manner in which the limit switches 135 and 136 are connected into the circuit is illustrated at the lower left portion of FIG. 23.

Referring now to FIG. 25, the manner in which the cam 18 acts to bring about vertical and horizontal displacement of the receiving means 12 is illustrated therein. The rotary cam 140, which is in the form of a cylinder eccentrically mounted for rotation about an axis parallel to but spaced from its own axis, acts on the cam-follower roller 141 connected to the bottom end of a vertically extending guide rod 142, a second guide rod being fixed to and extending parallel to this guide rod 142 so that they both move in unison in response to rotation of the cam 140. The receiving means 12 is directly carried by the vertically displaceable guide rods 142, so that with this construction the receiving means 12 will be displaced upwardly from the spindles 11, in the manner indicated in FIG. 4, and now the cam 143 acts on the bearings for the vertically displaceable guide rods 142 so as to shift the latter together with the receiving means 12 in a horizontal direction to the holding means 19, as indicated in FIG. 5. For this purpose the structure which carries the bearings which guide the rods 142 is itself guided by horizontal guide rods 144. After the needles are delivered to the holding means 19 the parts shown in FIG. 25 return to their original position.

It is to be noted that the electrical structure shown in FIG. 23 serves to stop the rotary movement of the transport spindles 11 when the predetermined number of tubes 1 are in readiness to be delivered to the next holding means 19.

Referring now to FIG. 11, it will be seen that there is a common drive for the five cam shafts 145 with their cams 26 as well as for the rotary turret 24 with the six holding means 19 carried thereby, this drive being synchronized in such a way that when it is stationary the several holding means 19 are respectively situated in alignment with the three grinding units of FIGS. 6–8 and the removal station 40 where the removing means is located, so that all of the tubes at these various stations can all be acted upon simultaneously. The cams 26 act to shift the various operating units toward the several holding means 19, and after the various operations are carried out at the several stations the several units are again retracted.

As is indicated in FIGS. 26–28, each grinding cylinder 27 is adjustable in three directions so that all of the tubes 1 at each station can be simultaneously acted upon to be simultaneously ground. Thus, it is possible to bring about an adjustment in elevation of the grinding cylinder 27 by actuating the hand wheel 36 shown in FIG. 26, this hand wheel 36 rotating a screw which is threaded into a plate guided by the guides 38 in the manner shown in FIG. 28 for vertical displacement so as to vertically displace the grinding cylinder 27 which is carried by this plate.

Horizontal adjustment is brought about by adjustment of the yoke 39 which carries the cylinder 27. For this purpose FIG. 28 shows the pin 146 which extends rearwardly from the yoke and which is turnable about its axis to bring about angular adjustment in the manner shown in FIG. 27. The shaft or pin 146 is fixed in its adjusted position through any suitable set screws or the like.

In addition, the base plate 147 is swingable about the pin 148 shown in FIG. 28, so as to adjust the grinding cylinder 27 about a vertical axis, and for this purpose suitable pins extend through suitable guide slots, as shown in FIG. 28, and suitable set screws are also provided in this case to fix the structure in its adjusted position.

Referring now to FIGS. 29 and 30, the bearings 149 are provided to support the grinding cylinder 27 for rotary movement about its axis, this cylinder being directly carried by the shaft 153 which is turnable within the bearings 149. At its right end, as viewed in FIG. 29, beyond the cylinder 27 and the right bearing 149, the shaft 153 which carries the cylinder 27 also carries the electrical collector unit 152 through which the current is transmitted. This collector assembly includes the brush holder 150, shown in FIG. 30, with the pair of carbon brushes 34 carried thereby and engaging the grooved slip ring 152 of the collector assembly.

The current flows from a generator to the holding means 19. Between the conductive tubes 1 gripped by the holding means 19 and the diamond grinding cylinder there is an electrolytic fluid delivered by the spray nozzle 165 so as to close the circuit. The particles of the grinding cylinder 27 are bound together by a metal binder which is electrically conductive, so that the current flows to the shaft 153 and from the latter to the slip ring 152 and to the brushes 34 back to the generator. The electrolytic grinding assembly is insulated from the bearings 149 by way of electrically non-conductive rings 151.

As was pointed out above, the holding means 19 upon reaching the removing station 40 is displaced to its open position by coaction of the cam-follower roller 102 with the camming end 103 of the arcuate cam segment 104.

The conveyor means 4 includes the members 7 which are notched along their upper edges as described above and which move with respect to the stationary members 6 which are also notched at their upper ends. These movable components 7 move along the circular path 8 so as to step the tubes 1 upwardly along the conveyor means 4 until they are delivered to the rotary threaded spindles 11. As is apparent from FIG. 24, the pitch of the threads 137 has at the initial portion 138 of the spindles 11 a larger magnitude than in the second portion 139 to which the tubes are delivered from the portion 138 during rotary movement of the spindles 11. The larger pitch at the portion 138 enables the tubes to be reliably delivered successively to the successive convolutions of the thread 137. At the second portion 139 the convolutions of the thread 137 are so close to each other that it becomes possible to situate a relatively large number of tubes 1 in each holding means 19, inasmuch as in this case the output is independent of the machine.

The electrolytic liquid which is delivered by the nozzle 165 in the manner shown in FIG. 30 to the space between the needles and grinding cylinder to complete the electrical circuit is delivered through a conventional cooling structure, composed of a container, pump, filter, and hose-type conduits, and the specially developed spray nozzle 165 which has the configuration shown in FIG. 30 delivers the electrolyte to the operating station.

I claim:

1. In a machine for grinding the tips of injection needles, holding means for simultaneously holding a plurality of needles during simultaneous gridning of the tips thereof, feeding means coacting with said holding means for automatically feeding to the latter said plurality of needles which are to be ground at their tips, grinding means for simultaneously grinding the tips of said plurality of needles held by said holding means, control means coacting with said holding means and grinding means for controlling their movement one with respect to the other and removing means coacting with said holding means for removing finished needles therefrom after the tips of the needles have been ground, said holding means including a lower holding member made of polished steel and an upper holding member provided with a downwardly directed layer of yieldable, soft, elastic material.

2. The combination of claim 1 and wherein a cam-and-lever means coacts with said holding means for controlling the opening and closing thereof.

3. In a machine for grinding the tips of injection needles, holding means for simultaneously holding a plurality of needles during simultaneous grinding of the tips thereof, feeding means coacting with said holding means for automatically feeding to the latter needles which are to be ground at their tips, grinding means for simultaneously grinding the tips of needles held by said holding means, control means coacting with said holding means and grinding means for controlling their movement one with respect to the other, removing means coacting with said holding means for removing finished needles therefrom after the tips of the needles have been ground, said holding means including a lower holding member made of polished steel and an upper holding member provided with a downwardly directed layer of yieldable, soft, elastic material and cam-and-lever means coacting with said upper member of said holding means for providing a synchronized, controlled lateral shifting of said upper member with respect to said lower member for turning the needles held by said holding means respectively about their axes to provide for a peaked configuration of the gound ground tips of the needles.

4. In a machine for grinding the tips of injection needles, holding means for simultaneously holding a plurality of needles during simultaneous grinding of the tips thereof, feeding means coacting with said holding means for automatically feeding to the latter needles which are to be ground at their tips, grinding means for simultaneously grinding the tips of needles held by said holding means, control means coacting with said holding means and grinding means for controlling their movement one with respect to the other, removing means coacting with said holding means for removing finished needles therefrom after the tips of the needles have been ground, said feeding means including a vibrator for receiving elongated tubes which are to be formed into the injection needles and which have previously been cut to predetermined lengths, a rotary bucket wheel for receiving the tubes transported from said vibrator and for further transporting the tubes with a predetermined number thereof in the individual buckets of said bucket wheel, switch means coacting with said bucket wheel for angularly turning the latter at predetermined intervals, conveyor means for receiving needles successively from said buckets, respectively, and for conveying the needles successively through predetermined strokes, said conveying means being inclined upwardly at an angle of approximately 45° and having four guides which are substantially coextensive and parallel to each other and which are formed along their upper edges with notches for respectively receiving the tubes and maintaining them at predetermined distances from each other, said guides including a pair of stationary guides and a pair of movable guides located alongside of said stationary guides and a drive coacting with said movable guides for successively moving them through endless paths during which the movable guides raise the tubes and advance them along the notches of the stationary guides, and a horizontal guide means situated at the upper end of the upwardly inclined guides for receiving the needles therefrom, said horizontal guide means including a pair of horizontal members having at their upper edges substantially V-shaped teeth and gaps therebetween, and a pair of parallel rotary spindles formed at their exterior with spiral threads having at one end convolutions which receive the tubes from the conveyor means and said spindles advancing the tubes during rotation of said spindles with said tubes extending transversely across and supported by said spindles, receiving means for receiving the tubes from the spindles and including a lower bar having an upper edge provided with a coating of yieldable, soft, elastic material and having an upper member for holding the tubes down against the lower bar, said upper member being formed with grooves for respectively receiving the tubes, said receiving means coacting with said spindles for raising the tubes received by said receiving means upwardly away from said spindles and for delivering the tubes to the holding means.

5. The combination of claim 4 and wherein said spindles are respectively provided with threads which maintain said tubes extending perpendicularly across said spindles, means coacting with said spindles for rotating them in a direction which tends to displace said tubes in a given direction transversely of said spindles, and a stop strip extending longitudinally of said spindles and situated in the paths of movement of the tubes to engage the latter so as to axially position the tubes which slide along said stop strip as they are fed by said spindles.

6. The combination of claim 5 and wherein said spindles have at said threads thereof a relatively large pitch in the region of said spindles between said means for feeding the tubes successively through predetermined strokes and said receiving means while said threads of said spindles have a relatively short pitch at said receiving means for situating the tubes as close to each other as possible to provide at the receiving means as many tubes as possible to be simultaneously received and delivered thereby to the holding means.

7. The combination of claim 6 and wherein a single drive means is common to and operatively connected to said means for feeding said tubes in predetermined strokes and said spindles.

8. The combination of claim 7 and wherein a synchronous counting means coacts with said drive means for counting the predetermined number of tubes which reach said receiving means, and an end switch and magnetic clutch situated in an electrical circuit of said drive means and actuated by said synchronous counting means to stop the operation of said drive means and thus stop the operation of said spindles, said means for feeding the tubes in predetermined strokes, as well as to stop the operation of said bucket wheel and vibrator when the predetermined number of needles have been received by said receiving means.

9. The combination of claim 8 and wherein a vertical and horizontal cam means coacts with said receiving means for displacing the latter vertically and horizontally to deliver the tubes from said receiving means to said holding means.

10. The combination of claim 9 and wherein a synchronizing means coacts with said holding means for actuating the cam and lever means which coacts therewith to close said holding means to engage the tubes delivered thereto from said receiving means, and said synchronizing means then actuating said holding means and said grinding means for moving them in a controlled manner one relative to the other during grinding of the needles, and said synchronizing means then actuating said removing means.

11. In a machine for grinding the tips of injection needles, holding means for simultaneously holding a plurality of needles during simultaneous grinding of the tips thereof, feeding means coacting with said holding means for automatically feeding to the latter said plurality of needles which are to be ground at their tips, grinding means for simultaneously grinding the tips of said plurality of needles held by said holding means, control means coacting with said holding means and grinding means for controlling their movement one with respect to the other, removing means coacting with said holding means for removing finished needles therefrom after the tips of the needles have been ground, a plurality of said holding means being provided, rotary support means carrying said plurality of holding means and having a predetermined axis of rotation about which said plurality of holding means are uniformly distributed, Maltese-cross drive means coacting with said support means for angularly turning the latter to increments correspoding to the angular distance between the successive holding means carried by said support means to successively displace the plurality of holding means from one operating station to another operating station, a plurality of operating units distributed about said support means at said operating stations to coact with said plurality of holding means for simultaneously operating on needles carried by said plurality of holding means during intervals between the successive angular increments of turning of said support means and said plurality of holding means therewith, a plurality of synchronously controlled cam means respectively coacting with said plurality of operating units for displacing the latter simultaneously away from said plurality of holding means just before turning of said support means through said angular increment and for returning said plurality of units back toward said plurality of holding means at the end of the increment of angular turning of said support means and said plurality of holding means therewith, one of said operating units providing the primary grinding of the needles and including an elongated relatively wide diamond grinding wheel having a metal binder and carrying out during its operation, simultaneously, an oscillating movement parallel to its axis as well as an elevational movement swinging about its vertical and horizontal axes, a bearing means supporting said grinding wheel for rotary movement at the ends of said grinding wheel and a rotary sleeve being fixed to said grinding wheel and having a stationary axis, carbon brush means providing an electrical connection with the negative pole of a source of current, said brush means being insulated in said bearing means and a copper slip ring coacting with said carbon brush means and situated at a rotary pulley of said sleeve so that an electrical connection is provided through said brush means, said copper slip ring, said sleeve, and the metal-bound diamond grinding wheel while said holding means provides an electrical connection of the positive pole of the source of current to the needles which are being ground, and an electrolyte completing the electrical circuit and being directed to the location where the grinding takes place to provide for electrolytic grinding of said needles.

12. In a machine for grinding the tips of injection needles, holding means for simultaneously holding a plurality of needles during simultaneous grinding of the tips thereof, feeding means coacting with said holding means for automatically feeding to the latter needles which are to be ground at their tips, grinding means for simultaneously grinding the tips of needles held by said holding means, control means coacting with said holding means and grinding means for controlling their movement one with respect to the other, removing means coacting with said holding means for removing finished needles therefrom after the tips of the needles have been ground, a plurality of said holding means being provided, rotary support means carrying said plurality of holding means and having a predetermined axis of rotation about which said plurality of holding means are uniformly distributed, Maltese-cross drive means coacting with said support means for angularly turning the latter to increments corresponding to the angular distance between the successive holding means carried by said support means to successively displace the plurality of holding means from one operating station to another operating station, a plurality of operating units distributed about said support means at said operating stations to coact with said plurality of holding means for simultaneously operating on needles carried by said plurality of holding means during intervals between the successive angular increments of turning of said support means and said plurality of holding means therewith, a plurality of synchronously controlled cam means respectively coacting with said plurality of operating units for displacing the latter simultaneously away from said plurality of holding means just before turning of said support means through said angular increment and for returning said plurality of units back toward said plurality of holding means at the end of the increment of angular turning of said support means and said plurality of holding means therewith, one of said operating units providing the primary grinding of the needles and including an elongated relatively wide diamond grinding wheel having a metal binder and carrying out during its operation, simultaneously, an oscillating movement parallel to its axis as well as an elevational movement swinging about its vertical and horizontal axes, a bearing means supporting said grinding wheel for rotary movement at the ends of said grinding wheel and a rotary sleeve being fixed to said grinding wheel and having a stationary axis, carbon brush means providing an electrical connection with the negative pole of a source of current, said brush means being insulated in said bearing means and a copper slip ring coacting with said carbon brush means and situated at a rotary pulley of said sleeve so that an electrical connection is provided through said brush means, said copper slip ring, said sleeve, and the metal-bound diamond grinding wheel while said holding means provides an electrical connection of the positive pole of the source of current to the needles which are being ground, and an electrolyte completing the electrical circuit and being directed to the location where the grinding takes place to provide for electrolytic grinding of said needles, a second operating unit being situated at the next operating station after that where said one operating unit is located, said second operating unit providing for a peaked configuration for the ground tips of the needles and said second operating unit having the same structure as said one operating unit and including in addition controls for advancing said second unit twice toward and away from the holding means at said second operating station while said support means remains stationary, and said upper member of said holding means being shifted with respect to said lower member thereof in order to angularly turn the needles to provide the peaked configuration at the ground tips thereof at said second operating unit.

13. The combination of claim 12 and wherein at the next operating station there is a third operating unit which coacts with the ground needles situated at said third operating station for polishing the ground surfaces and for eliminating an oxide layer thereon by means of polishing brushes in the form of brass or polyamide hair brushes.

References Cited

UNITED STATES PATENTS

| | | | |
|---|---|---|---|
| 712,054 | 10/1902 | Fontaine | 163—4 |
| 2,041,547 | 5/1936 | Hofmann | 163—4 |
| 1,606,834 | 11/1926 | Halank | 221—236X |
| 2,818,964 | 1/1958 | Picard et al. | 221—225X |
| 2,870,938 | 1/1959 | Sirles et al. | 221—294X |
| 3,061,144 | 10/1962 | Brewer, et al. | 221—236X |
| 3,321,106 | 5/1967 | Shields | 221—236X |
| 3,310,301 | 3/1967 | Netta et al. | 221—217X |

JOHN H. MACK, Primary Examiner

R. J. FAY, Assistant Examiner

U.S. Cl. X.R.

51—281; 128—221; 204—143G, 212, 217, 225